United States Patent
Casasola

(10) Patent No.: US 9,894,210 B2
(45) Date of Patent: Feb. 13, 2018

(54) ADJUSTABLE DUAL-TONE MULTI-FREQUENCY PHONE SYSTEM

(71) Applicant: Wal-Mart Stores, Inc., Bentonville, AR (US)

(72) Inventor: Jose Casasola, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 15/270,183

(22) Filed: Sep. 20, 2016

(65) Prior Publication Data

US 2017/0085713 A1 Mar. 23, 2017

Related U.S. Application Data

(60) Provisional application No. 62/221,416, filed on Sep. 21, 2015.

(51) Int. Cl.
*H04M 3/527* (2006.01)
*H04M 7/12* (2006.01)
*H04M 3/493* (2006.01)

(52) U.S. Cl.
CPC ......... *H04M 3/527* (2013.01); *H04M 3/4938* (2013.01); *H04M 7/1295* (2013.01)

(58) Field of Classification Search
CPC .... H04M 3/493; H04M 3/527; H04M 7/0075; H04L 65/1069
USPC .... 370/252, 352; 379/70, 72, 88.01, 201.02, 379/245, 265.02, 88.18, 88.22, 266.07; 709/224
See application file for complete search history.

(56) References Cited

U.S. PATENT DOCUMENTS

| | | | | |
|---|---|---|---|---|
| 5,479,498 | A * | 12/1995 | Brandman | ............. H04L 27/30 379/283 |
| 6,449,269 | B1 * | 9/2002 | Edholm | ............. H04M 1/2535 370/352 |
| 7,260,191 | B1 | 8/2007 | Laurinavichus | |
| 7,397,905 | B1 | 7/2008 | Stewart et al. | |
| 7,492,874 | B2 | 2/2009 | Plan | |

(Continued)

FOREIGN PATENT DOCUMENTS

| | | |
|---|---|---|
| CN | 101132444 A | 2/2008 |
| WO | 2012107112 A1 | 8/2012 |

OTHER PUBLICATIONS

Dynamic Menu in IVR Systems, IVRS World, Mar. 27, 2014.

*Primary Examiner* — Gerald Gauthier
(74) *Attorney, Agent, or Firm* — McCarter & English, LLP; David R. Burns

(57) ABSTRACT

Provided herein are methodologies, systems, apparatus, and non-transitory computer-readable media for providing an adjustable dual-tone multi-frequency (DTMF) phone system. The DTMF phone system includes a DTMF adjustment module that interfaces with a base DTMF phone system and retrieves call parameter values from at least one properties file. The call parameter value is indicative of an audio file to be played by the DTMF phone system, or a DTMF call flow option file. The DTMF adjustment module provides the call parameter values to the base DTMF phone system. The base DTMF phone system includes a number of variables, and a DTMF call flow is generated by assigning at least one of the call parameter values to one or more of the variables within the base DTMF phone system.

18 Claims, 4 Drawing Sheets

(56) References Cited

U.S. PATENT DOCUMENTS

| | | | | |
|---|---|---|---|---|
| 7,515,695 B1* | 4/2009 | Chan | | H04M 3/493 |
| | | | | 379/221.09 |
| 7,773,731 B2 | 8/2010 | Malik et al. | | |
| 8,054,952 B1* | 11/2011 | Or-Bach | | G06Q 20/10 |
| | | | | 340/5.41 |
| 8,102,992 B2* | 1/2012 | Paden | | H04M 3/5234 |
| | | | | 370/237 |
| 8,265,261 B1* | 9/2012 | Adamson | | H04M 3/5166 |
| | | | | 379/245 |
| 8,290,125 B2* | 10/2012 | Grigsby | | G06F 3/167 |
| | | | | 370/352 |
| 8,411,828 B2* | 4/2013 | Ashton | | H04M 3/4938 |
| | | | | 379/88.01 |
| 8,494,148 B2* | 7/2013 | Erhart | | H04M 3/5166 |
| | | | | 379/207.12 |
| 8,717,915 B2* | 5/2014 | Dubut | | H04M 3/493 |
| | | | | 370/252 |
| 8,798,240 B2* | 8/2014 | Awad | | H04M 3/42068 |
| | | | | 379/221.05 |
| 8,923,489 B1* | 12/2014 | Roux | | H04L 67/306 |
| | | | | 379/72 |
| 9,106,745 B2* | 8/2015 | Grigsby | | G06Q 40/00 |
| 2001/0040942 A1* | 11/2001 | Glowny | | G11B 31/00 |
| | | | | 379/88.22 |
| 2001/0055372 A1* | 12/2001 | Glowny | | H04M 3/36 |
| | | | | 379/88.22 |
| 2002/0071424 A1* | 6/2002 | Chiu | | H04M 1/2535 |
| | | | | 370/352 |
| 2004/0122941 A1* | 6/2004 | Creamer | | H04M 3/42059 |
| | | | | 709/224 |
| 2009/0147932 A1 | 6/2009 | McGuire et al. | | |
| 2009/0147937 A1* | 6/2009 | Sullhan | | H04M 3/42068 |
| | | | | 379/201.02 |
| 2010/0278316 A1* | 11/2010 | Beauregard | | H04M 3/493 |
| | | | | 379/88.01 |
| 2012/0201238 A1* | 8/2012 | Lawson | | H04L 61/106 |
| | | | | 370/352 |
| 2013/0128883 A1* | 5/2013 | Lawson | | H04M 1/2473 |
| | | | | 370/352 |
| 2014/0169550 A1* | 6/2014 | Rienzo | | H04M 7/1295 |
| | | | | 379/266.07 |
| 2017/0085713 A1* | 3/2017 | Casasola | | H04M 3/527 |
| 2017/0085714 A1* | 3/2017 | Casasola | | H04M 3/4938 |
| 2017/0134443 A1* | 5/2017 | Lawson | | H04L 65/1069 |
| 2017/0134587 A1* | 5/2017 | Lawson | | H04M 7/0075 |

* cited by examiner

ADJUSTABLE DUAL-TONE MULTI-FREQUENCY PHONE SYSTEM

RELATED APPLICATIONS

This application claims priority to U.S. Provisional Patent Application Ser. No. 62/221,416 entitled "ADJUSTABLE DUAL-TONE MULTI-FREQUENCY PHONE SYSTEM," filed on Sep. 21, 2015, the content of which is hereby incorporated by reference in its entirety.

BACKGROUND

In general, dual-tone multi-frequency (DTMF) phone systems can identify certain input tones corresponding to phone button presses and provide a flow for directing calls based on the input. This processing flow for handling DTMF input and the subsequent responses is known as a "system flow" or "call flow". Certain existing DTMF systems allow adjustment of the DTMF call system flow parameters by editing the DTMF system code and re-compiling the edited DTMF system code.

BRIEF SUMMARY

Exemplary embodiments of the present invention provide systems, methods, and devices for providing an adjustable DTMF phone system. More particularly, exemplary embodiments provide a lightweight approach to call handling that enables the creation of an adjusted call flow without modifying and recompiling the code for the DTMF system.

In one embodiment, a method for providing an adjustable dual-tone multi-frequency (DTMF) phone system includes providing a DTMF adjustment module located at one or more servers. The DTMF adjustment module is separate from a base DTMF phone system. The method also includes retrieving at least one call parameter value using the DTMF adjustment module from a properties file located at the one or more servers. The at least one call parameter value is indicative of at least one of: an audio file to be played by the adjustable DTMF phone system, or a DTMF call flow option file. The method further includes providing the at least one call parameter value to the base DTMF phone system, via the DTMF adjustment module. The base DTMF phone system includes multiple variables. The method further includes generating a DTMF call flow by assigning the at least one call parameter value to at least one of the variables within the base DTMF phone system.

In another embodiment, a system for providing an adjustable DTMF phone system includes one or more servers programmed to provide a DTMF adjustment module located at the one or more servers. The DTMF adjustment module is separate from a base DTMF phone system. The servers are also programmed to retrieve at least one call parameter value using the DTMF adjustment module from a properties file located at the one or more servers. The at least one call parameter value is indicative of at least one of: an audio file to be played by the adjustable DTMF phone system, or a DTMF call flow option file. The one or more servers are further programmed to provide the at least one call parameter value to the base DTMF phone system, via the DTMF adjustment module, the base DTMF phone system including multiple variables. The one or more servers are also programmed to generate a DTMF call flow by assigning the at least one call parameter value to at least one of the variables within the base DTMF phone system.

Any combination or permutation of the embodiments is envisioned. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present disclosure will be more fully understood from the following description of exemplary embodiments when read together with the accompanying drawings, in which.

DETAILED DESCRIPTION

Figure 1:
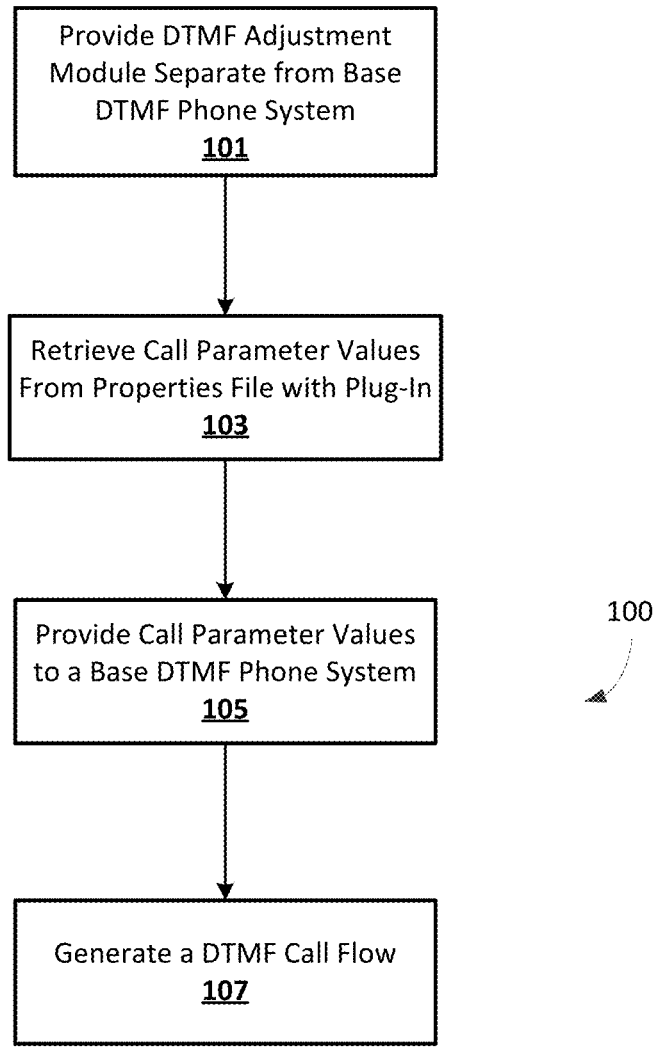
FIG. 1 is a flowchart illustrating an exemplary method of providing an adjustable DTMF phone system, according to art embodiment of the present invention.

Following below are more detailed descriptions of various concepts related to, and embodiments of, inventive methods, apparatus, and systems for providing an improved DTMF phone system. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited thereto, while the term "including" means including but is not limited thereto. The term "based on" means based at least in part on.

Example methodologies, systems, apparatus, and non-transitory computer-readable media are described herein to facilitate providing an adjustable DTMF phone system. Call centers typically receive calls routed through speech recognition enabled, or dual-tone multi-frequency (DTMF) enabled phone systems. Accordingly, DTMF phone systems output audio files, in response to scenarios within the DTMF phone system flow, identify tones that are recognizable by the system, and execute various options such as directing the call to a desired destination. The techniques described herein allow users to adjust the parameters of a DTMF phone system flow by accessing one or more properties files. The properties files are then accessed via a DTMF adjustment module that provides call parameter values from the properties files to a base DTMF phone system. Accordingly, users can add, remove, or modify parameters of the DTMF phone system without the need to edit the code of the base DTMF phone system, which can require programming skill, high level permissions or authorization, and cause significant delays. DTMF phone system parameters can include, for example, error announcements, exit announcements, announcements or audio files that play for each question or as a result of a caller input, the destination to which a call will transfer when an input is recognized, clarifying questions, confirmation announcements, the number of times a question will be repeated, what will happen if no caller input is received, which tones will be recognized as acceptable responses, etc. Each of the above parameters, as well as other similar parameters not explicitly mentioned herein, may all be added, deleted, or modified by editing the text of a properties files.

According to exemplary embodiments, a base DTMF phone system provides the underlying generic code that covers most applications. This generic code provides the foundation or framework for the DTMF phone system. A properties file is identified based on initial parameters, such as which number a caller used to access the DTMF phone system. A DTMF adjustment module interacts with the base DTMF phone system and pulls call parameter values from the appropriate properties file in order to set the variables within the base DTMF phone system, and therefore determine the DTMF system call flow. In some embodiments, a global properties file can provide global values to certain standardized or widely accepted variables within the base DTMF phone system. One such example includes repeating a previous message or question after a caller inputs "*" on a touch-tone phone. In such embodiments, a particular or customized properties file can overwrite global values and/or provide more specific or customized values to variables within the base DTMF phone system based on the initial call parameters. For example, more customized parameter values can indicate which audio files to play in response to certain caller inputs, or which tones will be recognized as acceptable responses for a given question. Any variables not accounted for by the properties file or files can be set to default values, or left blank, in various embodiments.

According to exemplary embodiments, once a call is received by the DTMF phone system, a greeting announcement or instructions are broadcast to the caller. The greeting, as well as initial call parameters, can be determined based on, for example, which number the caller dialed or which number the caller is calling from. The initial call parameters include values that are used to identify a properties filename and location to the adjustable DTMF module. The DTMF adjustment module then accesses the appropriate properties file at the indicated location and fills in the appropriate variables within the base DTMF phone system based on the call parameter values within the properties file. These values identify which announcements or audio files should be played, which options files should be accessed and executed, etc. The DTMF phone system then prompts the caller for input using the appropriate announcement or audio file, and valid options are set using the appropriate options file. The caller's response is then analyzed and an action is determined Example actions can include ending the call, playing an error announcement, transferring the call, requesting confirmation, proceeding to ask a new question, etc. Any adjustment to the properties file will allow the DTMF adjustment module to update values within the base DTMF phone system, and thus edit or modify the DTMF phone system flow without accessing the underlying DTMF phone system code.

By separating the parameters of a DTMF phone system into a separate properties file, a user can edit parameters of a DTMF phone system by simply modifying, deleting, or adding values within the properties file, instead of accessing and editing the code of a DTMF phone system. Rather than requiring programming skill and access to the underlying DTMF phone system code, a user only needs access to the properties file and knowledge of the values to modify within that file. Another benefit of using the adjustable DTMF module in connection with the base DTMF phone system and DTMF system properties files is that a user will no longer need to re-compile the code of an entire DTMF phone system in order to implement desired changes. Additionally, the use of a DTMF adjustment module and a locally stored properties file allows for an DTMF phone system to be updated and/or modified without the need to access external databases and create additional network traffic.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart illustrating an example method 100 for providing an adjustable DTMF phone system. In step 101 a DTMF adjustment module located is provided at the one or more servers. The DTMF adjustment module is separate from the base DTMF phone system.

In step 103, a DTMF adjustment module retrieves at least one call parameter value from a properties file. In exemplary embodiments, the DTMF adjustment module and the properties file are located at one or more servers, such that retrieval of a call parameter value from a properties file does not require access to external databases or the creation of network traffic. The at least one call parameter value is indicative of an audio file to be played by the DTMF phone system, or a DTMF call flow option file. The audio files correspond to the questions and/or announcements output by the DTMF phone system, and the option files correspond to the response options or actions to be executed by the IVR system. In exemplary embodiments, the audio file includes an exit announcement, an error announcement, a clarifying question, a confirmation announcement, or a prompt for additional caller input. In exemplary embodiments, the DTMF call flow option file determines a destination to which a call will transfer when a caller input is recognized, a number of times a question or announcement will be repeated, an action to be performed when no caller input is received, or which tones will be recognized as acceptable responses. The DTMF call flow option file can include, for example, a .XML file (speech recognition grammar file), and both the DTMF call flow option files and the audio files can be stored locally at the one or more servers. In exemplary embodiments, a filename and location associated with the properties file are identified based on a number used by a caller to access the DTMF phone system.

In step 105, the DTMF adjustment module provides the call parameter values retrieved in step 103 to a base DTMF phone system. The base DTMF phone system provides the underlying generic code that covers most applications of the DTMF phone system. In exemplary embodiments, the base DTMF phone system provides the foundation or framework for the DTMF phone system and includes multiple variables, which correspond to audio files, options files, or other call flow parameters.

In step 107, a DTMF call flow is generated by assigning the call parameter values retrieved in step 103 to at least one of the variables within the base DTMF phone system. As discussed above, the properties file provides the DTMF adjustment module with the values corresponding to variables within the base DTMF phone system and directs the DTMF adjustment module to the appropriate audio files and options files, or .XML files, to be used in the DTMF call flow. The audio files correspond to the questions and/or announcements output by the DTMF phone system, and the .XML files correspond to the options files, which determine the appropriate options or actions to be executed by the DTMF phone system.

In exemplary embodiments, the call parameter values determine which audio files are output, which options files are executed, and set additional parameters corresponding to error announcements, exit announcements, announcements or audio files that play as a result of a caller input, the destination to which a call will transfer when an option selected is recognized, clarifying questions, confirmation announcements, the number of times a question will be repeated, what will happen if no caller input is received, which tones will be recognized as acceptable responses, etc. Accordingly, editing the properties file to include new or different values, directs the DTMF adjustment module to new or different audio files or options files, and thus edits the DTMF call flow. The call parameter values can also set additional parameters corresponding to the DTMF call flow, and the present invention is not limited to those parameters specifically mentioned above.

Figure 2:
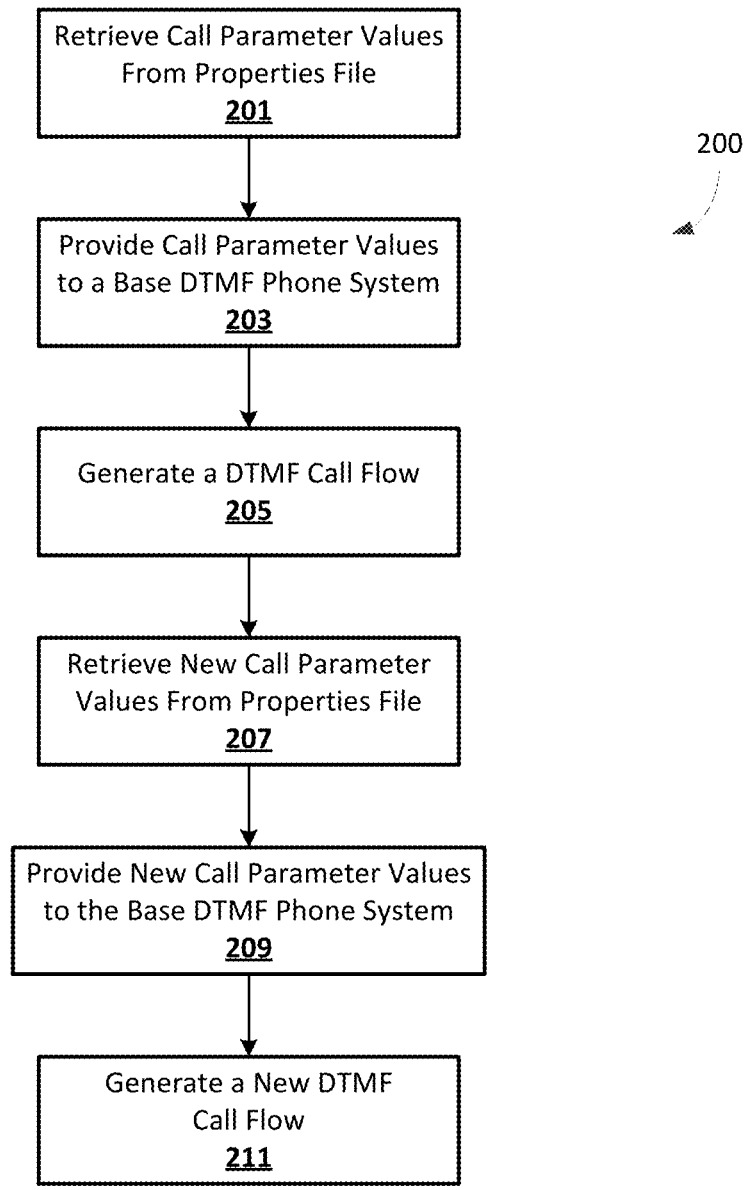
FIG. 2 is a flowchart illustrating another exemplary method of providing an adjustable IVR system, according to an embodiment of the present invention.

FIG. 2 is a flowchart illustrating an example method 200 for providing an adjustable DTMF phone system. In step 201, a DTMF adjustment module retrieves at least one call parameter value from a properties file. In exemplary embodiments, the DTMF adjustment module and the properties file are located at one or more servers, such that retrieval of a call parameter value from a properties file does not require access to external databases or the creation of network traffic. The at least one call parameter value is indicative of an audio file to be played by the DTMF phone system, or a DTMF call flow option file. The audio files correspond to the questions and/or announcements output by the DTMF phone system, and the option files correspond to the response options or actions to be executed by the IVR system. In exemplary embodiments, the audio file includes an exit announcement, an error announcement, a clarifying question, a confirmation announcement, or a prompt for additional caller input. In exemplary embodiments, the DTMF call flow option file determines a destination to which a call will transfer when a caller input is recognized, a number of times a question or announcement will be repeated, an action to be performed when no caller input is received, or which tones will be recognized as acceptable responses. The DTMF call flow option file can include, for example, a .XML file, and both the DTMF call flow option files and the audio files can be stored locally at the one or more servers. In exemplary embodiments, a filename and location associated with the properties file are identified based on a number used by a caller to access the DTMF phone system.

In step 203, the DTMF adjustment module provides the call parameter values retrieved in step 201 to a base DTMF phone system. The base DTMF phone system provides the underlying generic code that covers most applications of the DTMF phone system. In exemplary embodiments, the base DTMF phone system provides the foundation or framework for the DTMF phone system and includes multiple variables, which correspond to audio files, options files, or other call flow parameters.

In step 205, a DTMF call flow is generated by assigning the call parameter values retrieved in step 201 to at least one of the variables within the base DTMF phone system. As discussed above, the properties file provides the DTMF adjustment module with the values corresponding to variables within the base DTMF phone system and directs the DTMF adjustment module to the appropriate audio files and options files, or .XML files, to be used in the DTMF call flow. The audio files correspond to the questions and/or announcements output by the DTMF phone system, and the .XML files correspond to the options files, which determine the appropriate options or actions to be executed by the DTMF phone system.

In step 207, a DTMF adjustment module retrieves at least one new call parameter value from an edited properties file. As discussed above, a user can add, modify, or delete call parameter values within the DTMF properties file, either manually or via a graphical user interface, in some embodiments. Once the call parameter values within a properties file have been adjusted, those new values will be retrieved by the DTMF adjustment module.

In step 209, the DTMF adjustment module provides the new call parameter values retrieved in step 207 to the base DTMF phone system. As discussed above, the base DTMF phone system provides the foundation or framework for the DTMF phone system and includes multiple variables, which correspond to audio files, options files, or other call flow parameters.

In step 211, a new DTMF call flow is generated by assigning the new call parameter values retrieved in step 207 to at least one of the variables within the base DTMF phone system. As discussed above, the properties file provides the DTMF adjustment module with the values corresponding to variables within the base DTMF phone system and directs the DTMF adjustment module to the appropriate audio files and options files to be used in the DTMF call flow. Accordingly, editing the properties file to include new call parameter values directs the DTMF adjustment module to new or different audio files or options files, and thus edits the DTMF call flow.

Figure 3:
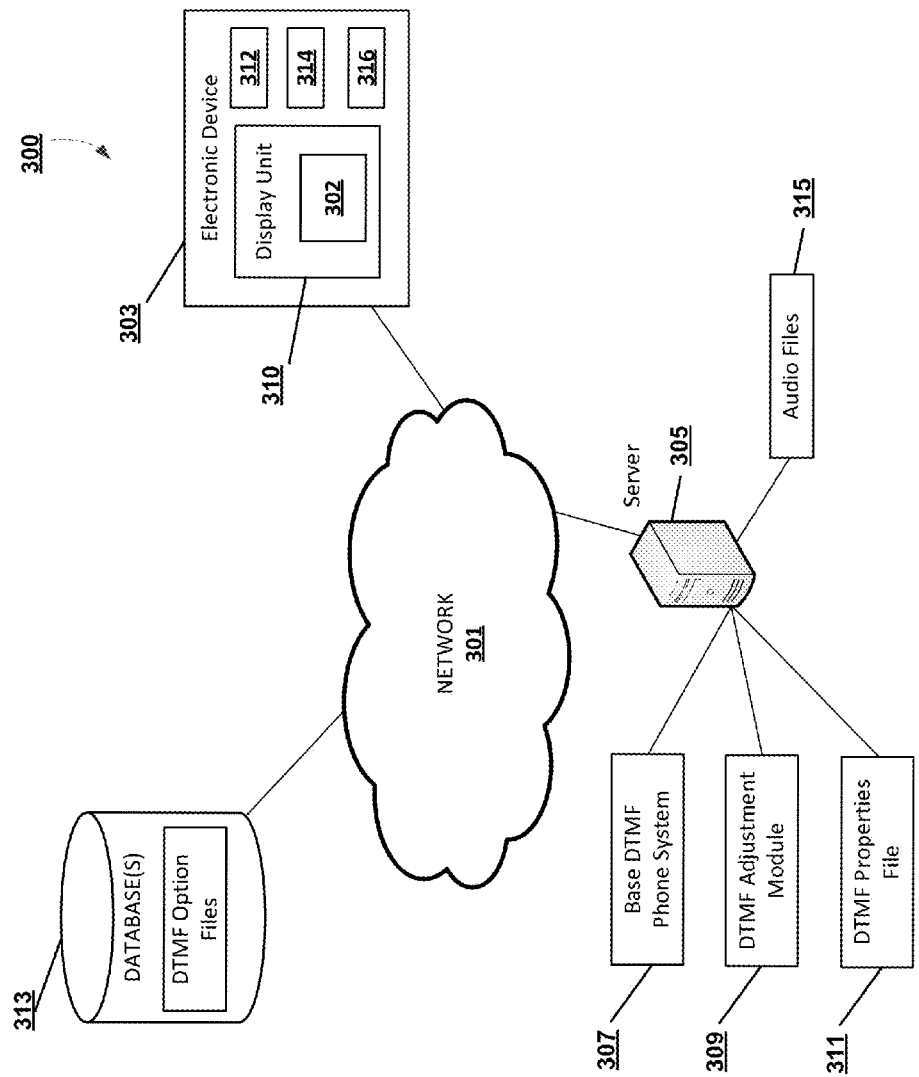
FIG. 3 is a diagram of an exemplary network environment suitable for a distributed implementation of an exemplary embodiment of the present invention.

FIG. 3 is a diagram of an example network environment 300 suitable for a distributed implementation of example embodiments. The network environment 300 can include one or more servers 305 and a database 313 associated with one or more servers 305. In exemplary embodiments, the database 313 can store the DTMF call flow option files, while the one or more servers 305 can store base DTMF phone system 307, DTMF adjustment module 309, DTMF properties files 311, and audio files 315, which can implement one or more of the processes described herein with respect to FIGS. 1-2. In alternative embodiments, the DTMF option files can also be stored locally at the one or more servers 305. The network environment may also include an electronic display device 303, that may display a GUI 302 to a user. The electronic display device 303 can include a display unit 310; a processing device 312; memory 314; and a network interface 316 where the processing device executes instructions in memory (e.g., in response to instructions from the one or more servers 305) to control an operation of the display unit as described herein. Once the electronic device 303 receives instructions transmitted by the one or more servers 305 (e.g., via the network interface 316), the GUI 302 may be rendered on the display unit 310 of the electronic device 303 (e.g., in response to execution of the instructions by the processing device 312) to allow a user of the electronic device 303 to interact with the server 305 or 309 to implement embodiments of the present invention.

In exemplary embodiments, the one or more servers 305, database 313, and the electronic device 503 may be in communication with each other via a communication network 301. The communication network 301 may include, but is not limited to, the Internet, an intranet, a LAN (Local Area Network), a WAN (Wide Area Network), a MAN (Metropolitan Area Network), a wireless network, an optical network, and the like. In exemplary embodiments, the electronic device 303 that is in communication with the one or more servers 305 and database 313 can generate and transmit a database query requesting information from the raw data matrices or database 313. As described above in reference to FIGS. 1-2, the one or more servers 305 can transmit instructions to the electronic device 303 over the communication network 301. The one or more servers 305 can interact with the electronic device 303 and database 313 over communication network 301 to render a GUI on an operation of the electronic device 303, as described herein. Each of the one or more servers 305, base DTMF phone system 307, DTMF adjustment module 309, and electronic device 303, can be implemented using one or more components described in reference to computing device 400 and visual display device 303, which are discussed in more detail below with respect to FIG. 4.

Figure 4:
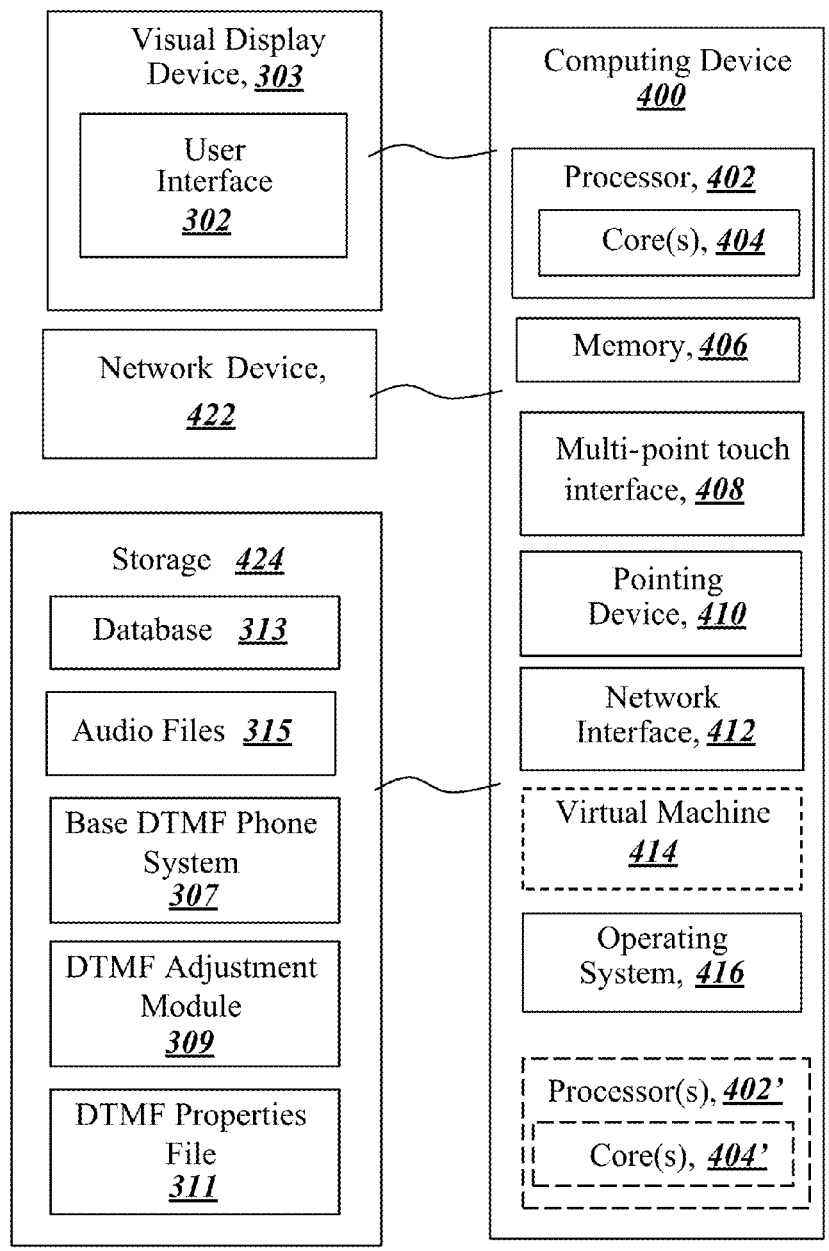
FIG. 4 is a block diagram of an exemplary computing device that can be used to perform exemplary processes in accordance with an exemplary embodiment of the present invention.

FIG. 4 is a block diagram of an exemplary computing device 400 that can be used in the performance of any of the example methods according to the principles described herein. The computing device 400 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like. For example, memory 406 included in the computing device 400 can store computer-readable and computer-executable instructions or software for implementing exemplary embodiments, such as base DTMF phone system 307 or DTMF adjustment module 309, programmed to perform processes described herein. The computing device 400 also includes processor 402 and associated core 404, and optionally, one or more additional processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' can each be a single core processor or multiple core (404 and 404') processor.

Virtualization can be employed in the computing device 400 so that infrastructure and resources in the computing device can be shared dynamically. A virtual machine 414 can be provided to handle a process running on multiple processors so that the process appears to be using only one computing resource rather than multiple computing resources. Multiple virtual machines can also be used with one processor.

Memory 406 can be non-transitory computer-readable media including a computer system memory or random access memory, such as DRAM, SRAM, EDO RAM, and the like. Memory 406 can include other types of memory as well, or combinations thereof.

A user can interact with the computing device 400 through a visual display device 303, such as a touch screen display or computer monitor, which can display one or more graphical user interfaces 302 that can be provided in accordance with exemplary embodiments. The computing device 400 can include other I/O devices for receiving input from a user, for example, a keyboard or any suitable multi-point touch interface 408, a pointing device 410 (e.g., a pen, stylus, mouse, or trackpad). The keyboard 408 and the pointing device 410 can be coupled to the visual display device 303. The computing device 400 can include other suitable conventional I/O peripherals.

The computing device 400 can also include one or more storage devices 424, such as a hard-drive, CD-ROM, or other non-transitory computer readable media, for storing data and computer-readable instructions and/or software, such as the base DTMF phone system 307, DTMF adjustment module 309, DTMF properties files 311, and audio files 315, which may implement exemplary embodiments of the methods and systems as taught herein, or portions thereof. In exemplary embodiments, the DTMF properties files 311 are stored at a local storage device, not at a database. Exemplary storage device 424 can also store one or more databases 413 for storing any suitable information required to implement exemplary embodiments. The databases can be updated by a user or automatically at any suitable time to add, delete or update one or more items in the databases. An exemplary database 413 can store the DTMF options files and any other data/information used to implement exemplary embodiments of the systems and methods described herein. In alternative embodiments, the DTMF options files can be saved locally, as are the DTMF properties files 311.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. The network interface 412 can include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 400 can run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 416 can be run in native mode or emulated mode. In an exemplary embodiment, the operating system 416 can be run on one or more cloud machine instances.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes multiple system elements, device components or method steps, those elements, components or steps can be replaced with a single element, component or step. Likewise, a single element, component or step can be replaced with multiple elements, components or steps that serve the same purpose. Moreover, while example embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. An adjustable dual-tone multi-frequency (DTMF) phone system, comprising:
    one or more servers programmed to:
        provide a DTMF adjustment module located at the one or more servers, the DTMF adjustment module separate from a base DTMF phone system;
        identify a filename and location associated with a properties file based on a number used by a caller to access the DTMF phone system or a number from which the caller called the DTMF phone system, the properties file located at the one or more servers and holding parameter values for a DTMF call flow;
        retrieve at least one call parameter value using the DTMF adjustment module from the properties file, the at least one call parameter value indicative of at least one of: an audio file to be played by the adjustable DTMF phone system, or a DTMF call flow option file;
        provide the at least one call parameter value to the base DTMF phone system, via the DTMF adjustment module, the base DTMF phone system including a plurality of variables; and
        generate a DTMF call flow by assigning the at least one call parameter value to at least one of the plurality of variables within the base DTMF phone system.

2. The system of claim 1, wherein the audio file to be played includes at least one of: an exit announcement, an error announcement, a clarifying question, a confirmation announcement, or a prompt for additional caller input.

3. The system of claim 1, wherein the DTMF call flow option file determines at least one of: a destination to which a call will transfer when a caller input is recognized, a number of times a question or announcement will be repeated, an action to be performed when no caller input is received, or which tones will be recognized as acceptable responses.

4. The system of claim 1, wherein the DTMF call flow option file includes a .XML file.

5. The system of claim 1, wherein the one or more servers are further programmed to:
    retrieve at least one new call parameter value from an edited properties file, using the DTMF adjustment module;
    provide the at least one new call parameter value to the base DTMF phone system, via the DTMF adjustment module; and
    generate a new DTMF call flow, via the DTMF adjustment module, by assigning the at least one new call parameter value to at least one of the plurality of variables within the base DTMF phone system.

6. The system of claim 1, wherein the DTMF call flow option file and audio files are located at the one or more servers.

7. A method for providing an adjustable dual-tone multi-frequency (DTMF) phone system, the method comprising:
    providing a DTMF adjustment module located at one or more servers, the DTMF adjustment module separate from a base DTMF phone system;
    identifying a filename and location associated with a properties file based on a number used by a caller to access the DTMF phone system or a number from which the caller called the DTMF phone system, the properties file located at the one or more servers and holding parameter values for a DTMF call flow;
    retrieving at least one call parameter value using the DTMF adjustment module from the properties file, the at least one call parameter value indicative of at least one of: an audio file to be played by the adjustable DTMF phone system, or a DTMF call flow option file;
    providing the at least one call parameter value to the base DTMF phone system, via the DTMF adjustment module, the base DTMF phone system including a plurality of variables; and
    generating a DTMF call flow by assigning the at least one call parameter value to at least one of the plurality of variables within the base DTMF phone system.

8. The method of claim 7, wherein the audio file to be played includes at least one of: an exit announcement, an error announcement, a clarifying question, a confirmation announcement, or a prompt for additional caller input.

9. The method of claim 7, wherein the DTMF call flow option file determines at least one of: a destination to which a call will transfer when a caller input is recognized, a number of times a question or announcement will be repeated, an action to be performed when no caller input is received, or which tones will be recognized as acceptable responses.

10. The method of claim 7, wherein the DTMF call flow option file includes a .XML file.

11. The method of claim 7, further comprising:
    retrieving at least one new call parameter value from an edited properties file, using the DTMF adjustment module;
    providing the at least one new call parameter value to the base DTMF phone system, via the DTMF adjustment module; and
    generating a new DTMF call flow, via the DTMF adjustment module, by assigning the at least one new call parameter value to at least one of the plurality of variables within the base DTMF phone system.

12. The method of claim 7, wherein the DTMF call flow option file and audio files are located at the one or more servers.

13. A non-transitory computer readable medium storing instructions executable by a processing device, wherein execution of the instructions provides an adjustable dual-tone multi-frequency (DTMF) phone system on an electronic display device, the execution of the instructions:

providing a DTMF adjustment module located at one or more servers, the DTMF adjustment module separate from a base DTMF phone system;

identifying a filename and location associated with a properties file based on a number used by a caller to access the DTMF phone system or a number from which the caller called the DTMF phone system, the properties file located at the one or more servers and holding parameter values for a DTMF call flow;

retrieving at least one call parameter value using the DTMF adjustment module from the properties file, the at least one call parameter value indicative of at least one of: an audio file to be played by the adjustable DTMF phone system, or a DTMF call flow option file;

providing the at least one call parameter value to the base DTMF phone system, via the DTMF adjustment module, the base DTMF phone system including a plurality of variables; and generating a DTMF call flow by assigning the at least one call parameter value to at least one of the plurality of variables within the base DTMF phone system.

14. The medium of claim 13, wherein the audio file to be played includes at least one of: an exit announcement, an error announcement, a clarifying question, a confirmation announcement, or a prompt for additional caller input.

15. The medium of claim 13, wherein the DTMF call flow option file determines at least one of: a destination to which a call will transfer when a caller input is recognized, a number of times a question or announcement will be repeated, an action to be performed when no caller input is received, or which tones will be recognized as acceptable responses.

16. The medium of claim 13, wherein the DTMF call flow option file includes a .XML file.

17. The medium of claim 13, wherein execution of the instructions further causes the DTMF adjustment module to:

retrieve at least one new call parameter value from an edited properties file;

provide the at least one new call parameter value to the base DTMF phone system; and generate a new DTMF call flow by assigning the at least one new call parameter value to at least one of the plurality of variables within the base DTMF phone system.

18. The medium of claim 13, wherein the DTMF call flow option file and audio files are located at the one or more servers.

* * * * *